United States Patent
Nam et al.

(10) Patent No.: US 7,436,852 B2
(45) Date of Patent: Oct. 14, 2008

(54) RESOURCE ALLOCATION METHOD FOR PROVIDING LOAD BALANCING AND FAIRNESS FOR DUAL RING

(75) Inventors: Hong Soon Nam, Daejeon (KR); Heyung Sub Lee, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 891 days.

(21) Appl. No.: 10/695,174

(22) Filed: Oct. 27, 2003

(65) Prior Publication Data

US 2004/0100984 A1 May 27, 2004

(30) Foreign Application Priority Data

Nov. 26, 2002 (KR) .................... 10-2002-0073732

(51) Int. Cl.
*H04J 3/16* (2006.01)
(52) U.S. Cl. .................. 370/468; 370/395.21; 370/404
(58) Field of Classification Search ......... 370/229–235, 370/248–249, 395.21, 468
See application file for complete search history.

(56) References Cited

U.S. PATENT DOCUMENTS

| 5,706,278 | A | * | 1/1998 | Robillard et al. | ............ 370/222 |
| 6,108,338 | A | | 8/2000 | Ramfelt et al. | |
| 6,314,110 | B1 | * | 11/2001 | Chin et al. | .................. 370/468 |
| 6,363,319 | B1 | | 3/2002 | Hsu | |
| 7,126,910 | B1 | * | 10/2006 | Sridhar | ........................ 370/229 |
| 2002/0018481 | A1 | * | 2/2002 | Mor et al. | .................... 370/403 |
| 2002/0067835 | A1 | | 6/2002 | Vatter | |
| 2002/0118700 | A1 | * | 8/2002 | Bruckman | .................. 370/460 |
| 2003/0041211 | A1 | * | 2/2003 | Merkey et al. | .............. 711/114 |
| 2003/0072268 | A1 | | 4/2003 | Nishimura et al. | |

FOREIGN PATENT DOCUMENTS

WO    WO 03/067835    8/2003

OTHER PUBLICATIONS

IEEE 802.17 Plenary Meeting, Vancouver, BC, Canada, Jul. 2002, "Computing Fair Rates in RPR", 16 pages.
"High Performance Fair Bandwidth Allocation for Resilient Packet Rings", V. Gambiroza, et al., Proceedings of the 15th ITC Specialist Seminar on Traffic Engineering and Traffic Management, 12 pages, 2002.

* cited by examiner

*Primary Examiner*—Chi H. Pham
*Assistant Examiner*—Phuc Tran
(74) *Attorney, Agent, or Firm*—Blakely, Sokoloff, Taylor & Zafman LLP

(57) ABSTRACT

Disclosed herein is a resource allocation method for providing load balancing and fairness for a dual ring. The resource allocation method includes the step of determining whether a bandwidth allocation request message is received from one of other nodes. If the bandwidth allocation request message is received, it is determined whether one or more of two rings of the dual ring fulfill a request of the bandwidth allocation request message. If the rings fulfill the request, a path is allocated to one of the rings having a lower weighted cost. A resource allocation information notification message is provided to other nodes. If the rings cannot fulfill the request, the process ends.

15 Claims, 14 Drawing Sheets

| SRC | DST | RI | SEQ | PRI | BW |

FIG. 4

| SRC | RI | SEQ | PRI | BW0 | BW1 | BW2 | o o o | BWn-1 |

FIG. 5

RESOURCE ALLOCATION METHOD FOR PROVIDING LOAD BALANCING AND FAIRNESS FOR DUAL RING

BACKGROUND OF THE INVENTION

1. Field of the Invention

The present invention relates generally to a resource allocation method for providing load balancing and fairness for a dual ring, and more particularly to a resource allocation method for providing load balancing and fairness for a dual ring, which is capable of increasing the efficiency of utilization of resources by balancing loads on the dual ring including a plurality of nodes, and which is capable of providing fairness to the nodes as well as increasing the efficiency of utilization of resources by controlling the traffic of a best effort service in consideration of ring topology.

2. Description of the Prior Art

A dual ring scheme, as depicted in FIG. 1, is a communication method in which a plurality of nodes N0~N4 communicate with each other while sharing two rings 11 and 12 that transmit data in opposite directions, which is adopted in Resilient Packet Ring (RPR) networks, Synchronous Optical NETworks (SONETs), Fiber Distributed Data Interface (FDDI) networks, token ring networks, or the like.

Meanwhile, in the conventional FDDI or token ring networks, once even unicast data transmitted between a single transmitter and a single receiver is transmitted to a ring, the unicast data cannot be eliminated at a receiving node, but is eliminated only at a transmitting node, so the efficiency of the ring is relatively low. The SONET is disadvantageous in that only one of its two rings is used to transmit data and multicast or broadcast data should be transmitted to each of receiving nodes.

In order to overcome the above-described problems, Dynamic synchronous Transfer Mode (DTM) and Dynamic Packet Transfer (DPT) remove unicast data, transmitted by a transmitting node, from a receiving node to be reused by other nodes. This is referred to as spatial reuse, which allows ring resources to be efficiently used.

In addition, the resource allocation methods that take loads into consideration include a method in which a server or Quality of Service (QoS) broker is provided at a center and the server or QoS broker allocates resources in consideration of the traffic of all networks, a method in which resources are allocated to next nodes one by one, and a method in which K possible paths are previously detected and resources are allocated to the paths.

These conventional resource allocation methods require complicated processes and an excessive amount of information so as to take the loads of a network into consideration. In a dual ring, two paths exist between a source and a destination, so it is easy for every node of the dual ring to manage ring resource allocation information. Accordingly, these conventional resource allocation methods are not inappropriate to the dual ring.

In the meantime, to solve the disadvantages of the above-described conventional resource allocation methods, there have been proposed a plurality of schemes, some of which are described below.

U.S. Pat. No. 6,363,319 issued on Mar. 26, 2002 and entitled "Constant-based Route Selection Using Biased Cost" had proposed the introduction of biased cost parameters to overcome a load concentration phenomenon that is a problem of a conventional routing method in which a shortest path is selected at the time of allocating a path. In this case, the flow attribute includes a flow priority and a bandwidth demand, and the path attribute includes a link bandwidth and a maximum available link bandwidth. Traffic efficiency can be increased by taking into consideration the flow priority, the bandwidth demand, the link bandwidth and the maximum available link bandwidth in route selection.

In this patented method, route selection can be performed in both a central manner in which a central network server performs the route selection and a distributed manner in which each of label edge routers performs the route selection. In the case where the central server selects a route, excessive time and resources are required for the central server to calculate the paths. In the case of the distributed type method, the available bandwidths of all nodes are periodically advertised, biased costs are calculated and a path having a lowest biased cost is selected. Accordingly, as the period for which the available bandwidths are advertised becomes shorter, information becomes more apparent but overhead becomes larger; while as the period for which the available bandwidths are advertised becomes longer, overhead becomes smaller but information becomes scarcer.

U.S. Pat. No. 6,108,338 entitled "Method and Device for Dynamic Synchronous Transfer Mode in a Dual Ring Topology" proposed a method and device for transmitting packets on a dual ring in Dynamic Synchronous Transfer Mode (DTM). This patented method is intended to solve the problem in which in a token ring or Fiber Distributed Data Interface (FDDI) using shared mediums, a packet is deleted at a transmitting node having transmitted a packet, so only a single node can transmit a packet at one time. In this patented method, necessary time slots are allocated and data is transmitted according to allocated time slots. These time slots consist of control slots and data slots. This method works in such a way that the controller of each node additionally requests necessary data slots through a control slot in the case of an increase in the traffic of the node and data are transmitted through allocated data slots in the case of the allocation of data slots from one of other nodes. That is, necessary resources are dynamically allocated depending on traffic.

This patented method is advantageous in that a data slot can be reused because unicast data is deleted from a receiving node, and latency and packet loss, that is, defects of a packet-switched network, can be reduced and low link efficiency, that is, a defect of a circuit-switched network, can be improved because data are transmitted according to allocated time slots.

However, this patented method is disadvantageous in that necessary time slots are requested, allocated and used in the case of an increase in traffic, and one of other nodes cannot use one or more of the allocated time slots even in the case of not transmitting data using the time slots, thus wasting resources.

Another method is a method in which best effort data is first transmitted in the case of the existence of the best effort data to be transmitted on a dual ring and a rate is reduced in the case of congestion. Examples of this method include a method and distributed bandwidth allocation for spatial and local reuse disclosed in U.S. Pat. No. 6,314,110, a fairness algorithm for high-speed networks based on a Resilient Packet Ring (RPR) architecture (Stein Gjessing, CAC' 02, 2002), Distributed Virtual-time Scheduling in rings (DVSR, V. Gambiroza, et Al., Rice Univ., U.S.), High Performance Fair Bandwidth Allocation for Resilient Packet Rings (Proc. 15$^{th}$ ITC specialist seminar on traffic engineering and traffic management), etc.

In that case, the pair algorithms of the SRP and the RPR basically use similar control mechanisms. That is, each node belonging to a ring is comprised of an input buffer, an output buffer and a transmission buffer. Each of these buffers is operated in a first-in, first-out manner and undergoes a priority service. The priority of the priority service may include high, medium and low priority. Only negotiated traffic is received under high priority, and the received traffic undergoes a high priority service. A negotiated bandwidth undergoes a medium priority service, while a bandwidth exceeding the negotiated bandwidth undergoes a low priority service. Low priority traffic is provided with high utilization and fairness by a fairness algorithm.

These methods are controlled through four principal parameters, that is, an local_fair_rate, an advertised rate advertised_rate, an allowed rate allow_rate and a forward rate forward_rate. Each node periodically generates a fair packet. The node transmits null information to an upstream node in the case of no congestion and its local_fair_rate to the upstream node in the case of congestion, which rate is referred to as an advertised rate. When congestion occurs at a downstream node and a base node receives an advertised rate, the received advertised rate is set to the local fair rate, the own rate of the base node is reduced to be equal to or lower than the allowed rate and the advertised rate is transmitted to an upstream node. When congestion occurs at the base node, the base node sets a lower one of its local fair rate and received rate to an advertised rate and transmits the advertised rate to the upstream node. When congestion is eliminated by the upstream nodes reducing their rates, the rate of the congested node is gradually increased and this increased rate becomes an advertised rate, so the rates of other nodes are similarly increased and therefore all the nodes are stabilized. In the case where rates are increased by the elimination of congestion, when the rate of a link is C, a reserved rate is rev_rate and the increase coefficient of an allowed rate is Growth_coeff, an allowed rate calculated at regular periods is calculated using the following equation.

$$\text{allowed\_rate} = \text{allowed\_rate} + \frac{C\_\text{rev\_rate} - \text{allowed\_rate}}{\text{Growth\_coeff}} \quad (1)$$

if advertised_rate is null $$= \frac{\text{allowed\_rate} + \text{advertised\_rate}}{2} +$$

$$\frac{C - \text{rev\_rate} - \text{allowed\_rate}}{\text{Growth\_coeff}} \text{ else}$$

In this method, the rate of a downstream node becomes an advertised rate at the time of congestion, and upstream nodes gradually reduce their own rates and increase them in stages.

In this case, if the own rate of each upstream node is excessively slowly or much reduced, there occurs a problem in which the efficiency of utilization of a ring is reduced. That is, if the own rate is rendered excessively slow at the time of congestion, the congestion continues and buffer overflow may occur. On the contrary, if the own rate is rapidly reduced to an advertised rate, congestion can be rapidly eliminated but link efficiency is reduced.

For example, if the traffic of an upstream node is C and the traffic of a downstream node is $\epsilon$ at a ring having a maximum capacity C, all the traffic of the downstream node is C+$\epsilon$>C, thus causing congestion. When the congestion occurs, the downstream node informs the upstream node of its own rate $\epsilon$, and the upstream node reduces its own rate to a value $\epsilon$ and gradually increases its own rate to the vicinity of a value C. When the rate of the upstream node is equal to or greater than C-$\epsilon$, congestion occurs at the downstream node. In this case, the upstream node reduces its own rate to a value $\epsilon$, so the minimum utilization of a link is 2$\epsilon$. However, these methods are disadvantageous in that link efficiency is deteriorated by the periodic repetition of this process.

In order to solve the above-described disadvantages, DSVR is designed to increase the efficiency of utilization of resources and provide the fairness of nodes by measuring the number of active nodes and the rates of the active nodes, calculating a fair rate F of each node, transmitting the calculated fair rate to an upstream node and controlling the own rate of the upstream node according to the calculated fair rate at the upstream node.

This method generally increases the efficiency of utilization of rings and provides fairness to nodes, but reduces the efficiency of utilization of resources in the case where input traffic is dynamically and rapidly changed or traffic control is delayed between the transmitting node and the receiving node. Additionally, a receiving node must measure the traffic of all transmitting nodes that transmit data to the receiving node, so the method is disadvantageous in that hardware for implementing this method is complicated and it is difficult to calculate a fair rate for each of the nodes.

SUMMARY OF THE INVENTION

Accordingly, the present invention has been made keeping in mind the above problems occurring in the prior art, and an object of the present invention is to provide a resource allocation method for providing load balancing and fairness for a dual ring, in which a transmitting node can simply calculate costs required to reach a receiving node in consideration of a load, a lifetime and a priority using the characteristics of the dual ring, and a route is selected on the basis of the calculation of the costs.

Another object of the present invention is to provide a resource allocation method for providing load balancing and fairness for a dual ring, which in the case where bandwidths are allocated like the CR-LSP of MPLS, a route is selected in consideration of the loads of rings at a transmitting node and a best effort traffic is transmitted in consideration of dual ring topology though a shortest route with traffic gradually increased, thus increasing the efficiency of utilization of resources and providing fairness to the nodes.

Still another object of the present invention is to provide a resource allocation method for providing load balancing and fairness for a dual ring, which distributes loads at the time of allocating a shortest route so as to prevent lack of resources at the shortest route that may be caused by the concentration of traffic.

In order to accomplish the above object, the present invention provides a resource allocation method for providing load balancing and fairness for a dual ring, the dual ring being shared by a plurality of nodes connected to local networks, including the steps of determining whether a bandwidth allocation request message is received from one of other nodes; determining whether one or more of two rings of the dual ring fulfill a request of the bandwidth allocation request message on the basis of available bandwidths of the two rings and calculating weighted costs, if the bandwidth allocation request message is received; allocating a path to one of the two rings having a lower weighted cost, if one or more of two rings fulfill the request of the bandwidth allocation request message; providing a resource allocation information notification message to other nodes; and ending a process without allocation of a path, if one or more of two rings cannot fulfill the request of the bandwidth allocation request message.

In addition, the present invention provides a resource allocation method for providing load balancing and fairness for a dual ring, the dual ring being shared by a plurality of nodes connected to local networks, including the steps of setting a current state to a previous state; determining whether a downstream node is congested; setting an allowed rate using equation allow_rate=my_rate+(C−rev_rate−my_rate)/N (where allow_rate is an allowed rate of a base node, C is a rate of a link, rev_rate is a reserved rate, my_rate is an own rate of the base node, and N is a number of nodes) and setting the current state to a null state, if the downstream node is not congested; determining whether an own rate of the base node is greater than an advertised rate of the downstream node, if the downstream node is congested; setting the allowed rate using equation allow_rate=min[my_rate+(C−rev_rate−my_rate)/ N,advertised_rate] (where advertised_rate is an advertised rate) and setting the current state to a congested state, if the own rate of the base node is not greater than the advertised rate of the downstream node; determining whether the previous state is a congested state and whether a previous round trip time is not zero, if the own rate of the base node is greater than the advertised rate of the downstream node; setting the previous round trip time to the previous round trip time minus one, if the previous state is the congested state and the previous round trip time is not zero, and setting a current round trip time to the previous round trip time, if the previous state is not the congested state and the previous round trip time is zero; and setting the allowed rate using equation allow_rate=max [my_rate−{RTT(c−rev_rate)}/2N, my_rate/2, advertised_rate] and setting the current state to a congested state.

Preferably, the resource allocation method may further include the steps of initializing parameters of a round trip time counter, an upstream round trip time timestamp and a downstream round trip time timestamp; measuring a round trip time counting period, and increasing a round trip time counter by "1" when the round trip time counting period elapses; setting the downstream round trip time timestamp to "0" if a node is congested; determining whether the increased round trip time counter has a maximum value; and setting the upstream round trip time counter to the maximum value and resetting the round trip time counter to "0" if the round trip time counter has the maximum value, and setting the upstream round trip time timestamp to "0" if the round trip time counter does not have the maximum value.

Preferably, the resource allocation method may further include the steps of determining whether the downstream node is congested when the fair packet is received; increasing the downstream round trip time timestamp by a round trip time of a base node if the downstream node is congested; determining whether the downstream round trip time timestamp has a maximum value if the downstream node is not congested, ending a process if the downstream node is not congested and the downstream round trip time timestamp does not have the maximum value, and setting the round trip time to a value of the current round trip time counter if the downstream node is not congested and the downstream round trip time timestamp has the maximum value.

In addition, the present invention provides a resource allocation method for providing load balancing and fairness for a dual ring, the dual ring being shared by a plurality of nodes connected to local networks, each of the nodes being provided with a Primary Transit Queue (PTQ) and a Secondary Transit Queue (STQ), comprising the steps of reading a packet size of the STQ at regular intervals, and updating a local fair rate so that the local fair rate is reduced if a size of backlogged packets increases and the local fair rate approaches an initial rate if the size of backlogged packets decreases; comparing the set local fair rate with a received rate of a packet, and setting an advertised rate; and determining whether congestion has occurred, setting an allowed rate to the local fair rate if the congestion has occurred, and increasing the allowed rate by {(a non-reserved rate−a previous allowed rate)/a certain coefficient}; wherein the steps are performed at each of the nodes to control traffic of the node.

In addition, the present invention provides a computer-readable storage medium, includes a medium body; and a program stored in the medium body, the program being designed to execute steps of a method described above.

BRIEF DESCRIPTION OF THE DRAWINGS

The above and other objects, features and advantages of the present invention will be more clearly understood from the following detailed description taken in conjunction with the accompanying drawings, in which:

FIG. 4 is a view showing a data structure of a message that is used to transmit a reservation bandwidth between a transmitting node and a receiving node in the case where a new bandwidth is reserved or a reserved bandwidth is released;

FIG. 5 is a diagram showing a data structure of a message that is used to transmit bandwidth allocation data of a transmitting node in the resource allocation method of the present invention;

DESCRIPTION OF THE PREFERRED EMBODIMENTS

Figure 1:
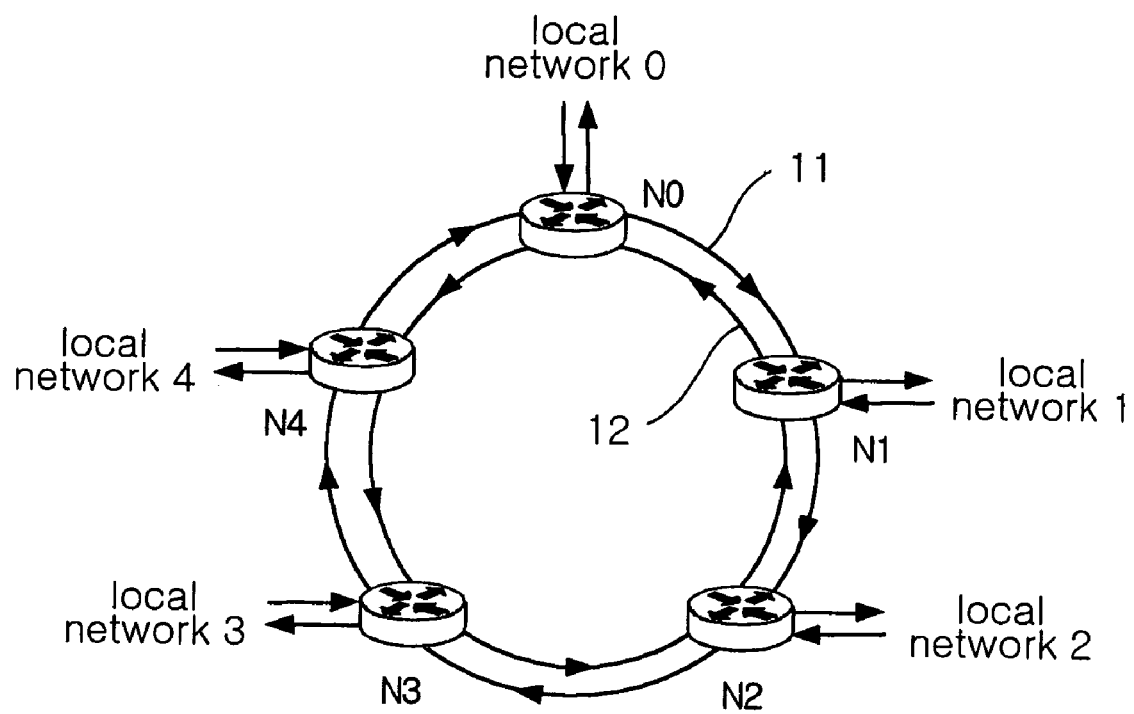
FIG. 1 is a schematic diagram showing a configuration of a general dual ring network.

Reference now should be made to the drawings, in which the same reference numerals are used throughout the different drawings to designate the same or similar components.

A resource allocation method for providing load balancing and fairness for a dual ring in accordance with the present invention is described in detail below.

FIG. 1 is a schematic diagram showing a configuration of a dual ring network comprised of five nodes N0~N4. In this dual ring network, an outer ring 11 transmits data in a clockwise direction, an inner ring 12 transmits data in a counter-clockwise direction, and local networks are connected to the nodes N0~N4, respectively. Accordingly, in this dual ring network, data can be transmitted from one local network to another.

Figure 2:
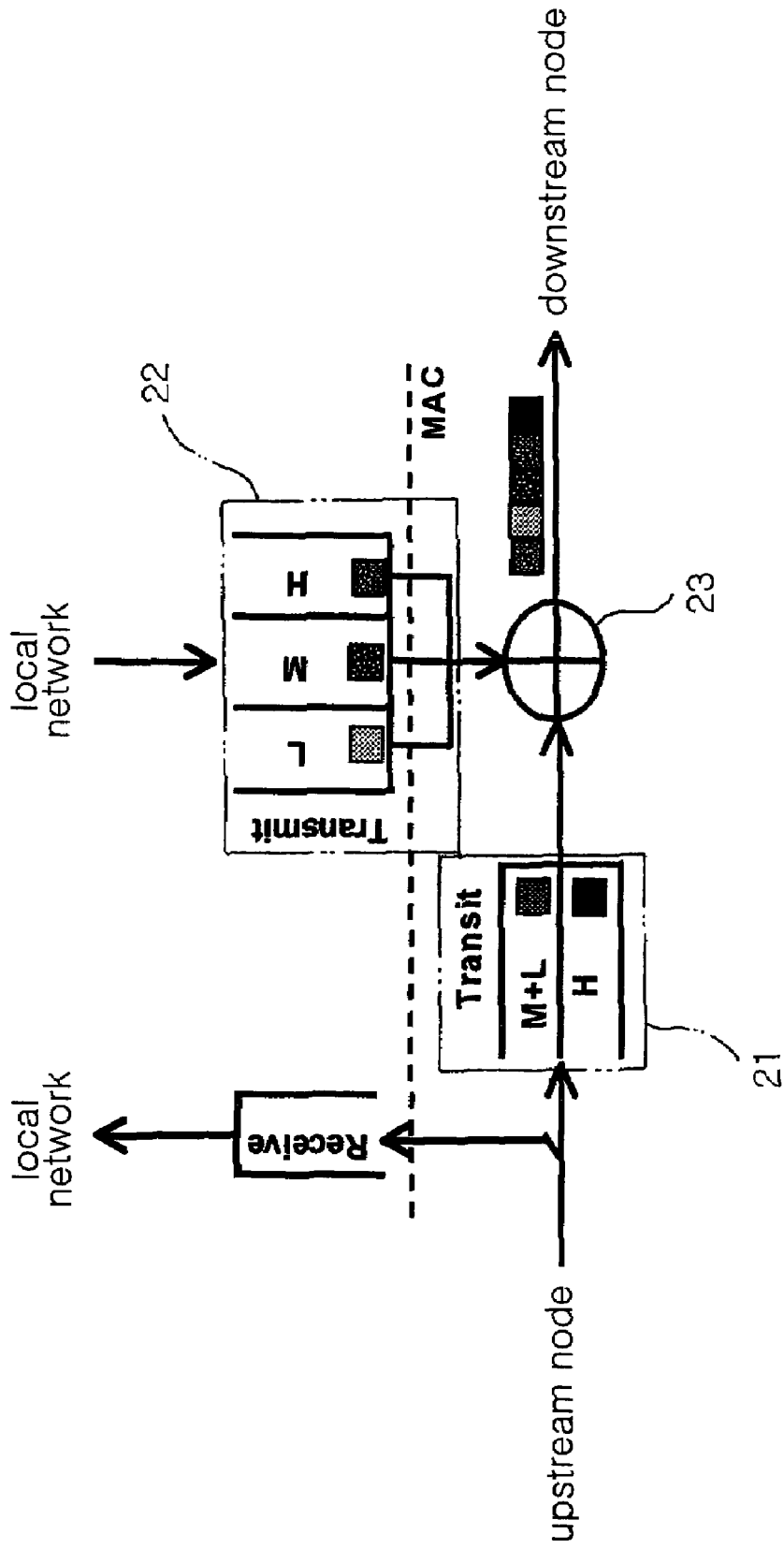
FIG. 2 is a diagram showing a configuration of each node of the dual ring network.

FIG. 2 is a diagram showing each node of the dual ring network to which the resource allocation method of the present invention is applied, in which a data transmitting side is referred to as an upstream node while a data receiving side is referred to as a downstream node. Each of the nodes of the dual ring network includes a transit buffer 21 for transmitting data from a upstream node to a downstream node and a transmit buffer 22 for loading data onto the rings 11 and 12.

The buffers 21 and 22 are separately managed in the order of priority, transit buffer consists of a primary transit queue (PTQ) and a secondary transit queue(STQ) and transmit buffer consists of class A, B and C. Class A has the highest priority. The scheduler 23 first transmit traffics having higher priorities, and allow traffics sensitive to delay, such as real-time traffics, higher priorities. As a result, the delay and delay transition of a higher priority service can be minimized.

Figure 3:
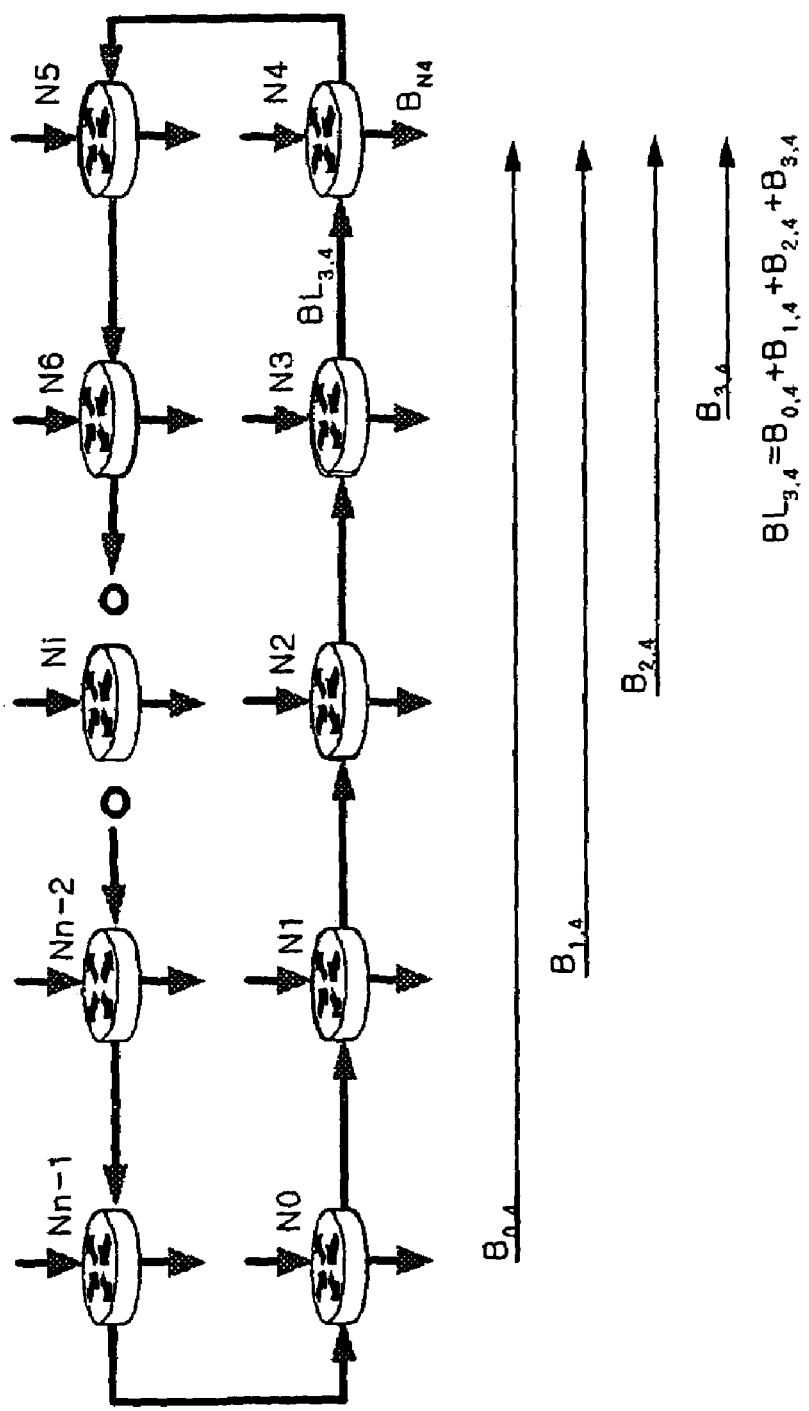
FIG. 3 is a diagram showing relationship between a bandwidth of a node of a ring and a bandwidth of a link.

FIG. 3 is a diagram showing relationship between the traffic of a node reserved in a ring and the traffic of a link. It is assumed that in a network comprised of n nodes, data is transmitted from nodes N0, N1, N2 and N3 to a node N4.

In such a case, in general, even though a bandwidth is reserved between the node N0 and the node N4, the intermediate nodes N1~N3 do not participate in the process of the reservation.

If a bandwidth reserved between a transmitting node Ni and a receiving node Nj is $B_{i,j}$, a bandwidth reserved between the node N0 and the node N4 is $B_{0,4}$ and a bandwidth reserved between the node N3 and the node N4 is $B_{3,4}$. If the total sum of traffics reserved on a link between the node N3 and the node N4 is $BL_{3,4}$, $BL_{3,4}$ becomes $B_{0,4}+B_{1,4}+B_{2,4}+B_{3,4}$ in FIG. 3.

Figure 4:
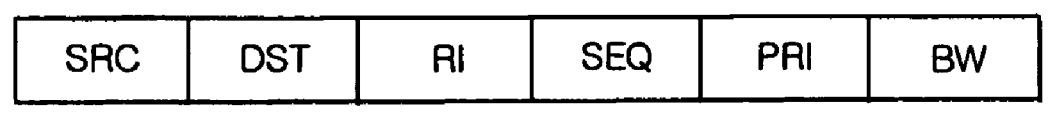

FIG. 4 is a view showing a data structure of a message that is used to transmit a reservation bandwidth between a transmitting node and a receiving node in the case where a new bandwidth is reserved or a reserved bandwidth is released. The message includes information on a transmitting node SRC, a receiving node DST, a ring identifier RI, a sequence number SEQ, a priority PRI and a bandwidth BW.

The sequence number SEQ designates a sequence number set according to a transmitting node. A new message is allotted a sequence number that is increased by one in comparison with a previous message. A retransmitted message is allotted the same sequence number as an original message.

Figure 5:
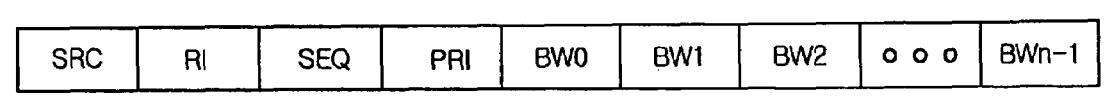

FIG. 5 is a diagram showing a data structure of a message that is used to transmit all its resource allocation data periodically or by request. As illustrated in this drawing, a single message includes information on a bandwidth reserved to reach all the other nodes from a base node. C designates the maximum rate of a link and manages the outer ring 11 and the inner ring 12. Rev_rate is a reserved rate to grantee the rate. $BW_0$ is a bandwidth used for broadcast or multicast, $BW_1$ designates a first node of a transmitting node and its reserved bandwidth, $BW_2$ designates a second node of the transmitting node and its reserved bandwidth, $BW_3$ designates a third node of the transmitting node and its reserved bandwidth, and $BW_{N-1}$ designates a N−1th node of the transmitting node and its reserved bandwidth.

The following equation represents a bandwidth allocation matrix.

$$\text{Bandwidth allocation matrix} = \begin{bmatrix} B_{N0} \\ B_{N1} \\ B_{N2} \\ \circ \\ B_{Ni} \\ \circ \\ B_{Nn-1} \end{bmatrix} \quad (2)$$

$$= \begin{bmatrix} B_{0,0} & B_{0,1} & B_{0,2} & \circ & B_{0,j} & \circ & B_{0,n-1} \\ B_{1,0} & B_{1,1} & B_{1,2} & \circ & B_{1,j} & \circ & B_{1,n-1} \\ B_{2,0} & B_{2,1} & B_{2,2} & \circ & B_{2,j} & \circ & B_{2,n-1} \\ \circ & \circ & \circ & \circ & \circ & \circ & \circ \\ B_{i,0} & B_{i,1} & B_{i,2} & \circ & B_{i,j} & \circ & B_{i,n-1} \\ \circ & \circ & \circ & \circ & \circ & \circ & \circ \\ B_{n-1,0} & B_{n-1,1} & B_{n-1,2} & \circ & B_{n-1,j} & \circ & B_{n-1,n-1} \end{bmatrix}$$

In equation (2), when $i=j$, $B_{i,j}$ represents a bandwidth for broadcast or multicast. From the above-described matrix, the transmitting bandwidth TB of a node Ni is $$TB_i = \sum_{j=0}^{n-1} B_{i,j},$$

and the receiving bandwidth RB is $$RB_i = \sum_{j=0}^{n-1} B_{i,j}.$$

Accordingly, the input traffic $IB_k$ and input available bandwidth $ABW_k$ of a random node Nk are expressed by equations 3 and 4.

$$IB_k = \sum_{i=0}^{k} \sum_{j=k}^{n-1} B_{i,j} + \sum_{i=k+1}^{n-1} \sum_{j=k}^{i} B_{i,j} \quad (3)$$

$$ABW_j = C - rev\_rate - IB_j \quad (4)$$

Figure 6:
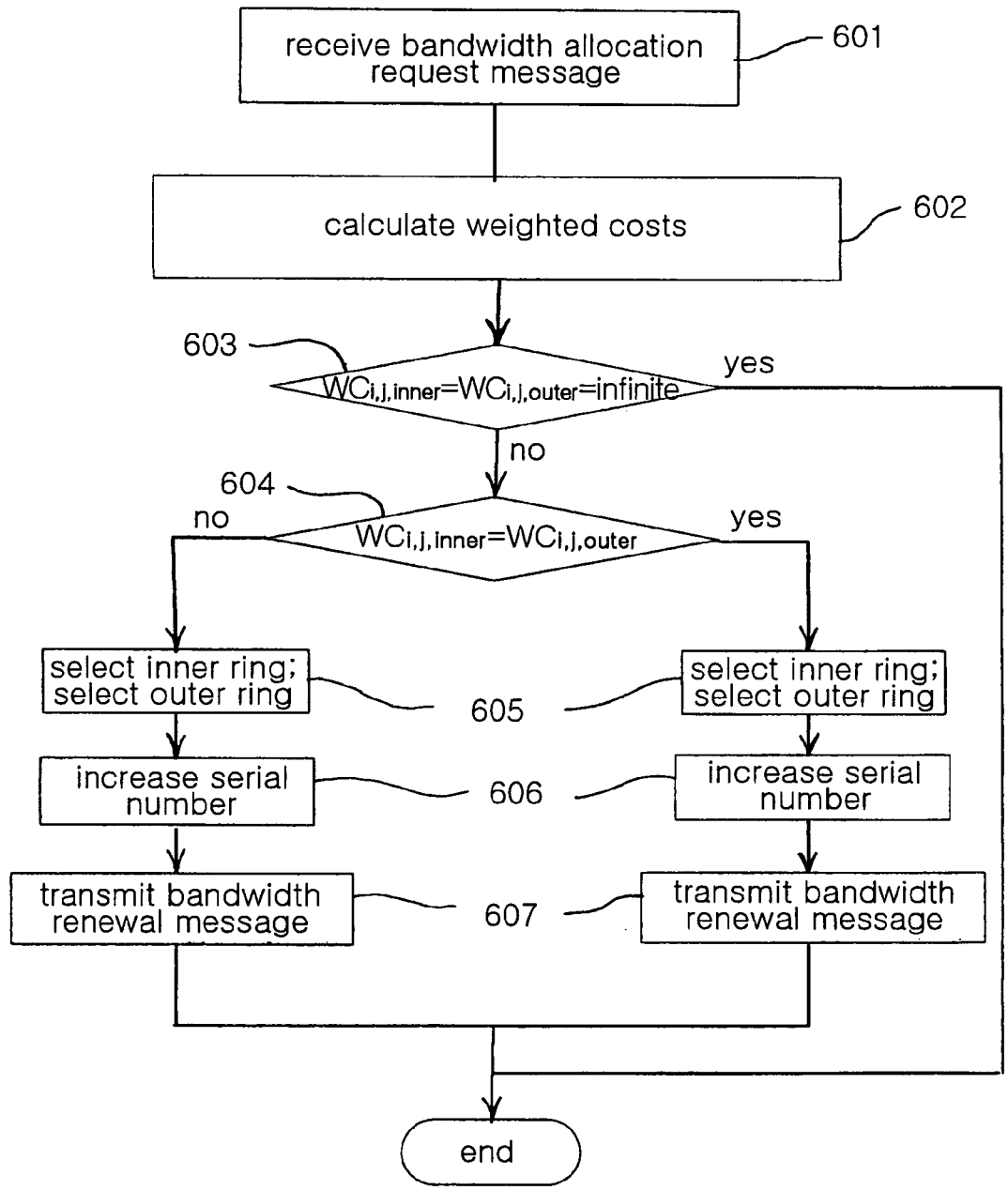
FIG. 6 is a flowchart showing a process of allocating paths in a dual ring according to a first embodiment of the present invention.

FIG. 6 is a flowchart showing a process of allocating paths in a dual ring according to a first embodiment of the present invention.

In the source allocation method of the present invention, when a request for bandwidth allocation is received, costs between transmitting nodes and receiving nodes are converted into weighted costs and a path having a lowest weighted cost is allocated in response to the request. This process is mainly applied to the case where a bandwidth is allocated in response to a dynamic request like Constraint-based Routed Label Switched Paths (CR-LSP) of Multi-Protocol Label Switching (MPLS), and may be applied to the case where a bandwidth is allocated at the request of a manager.

The above-described process starts with the receiving of a bandwidth allocation request message "RB (src, dst, bw, priority, life_time)" at step 601, which carries information on a transmitting node "src", a receiving node "dst", a bandwidth "bw", a priority "priority" and a lifetime "life_time".

A node having received such a bandwidth allocation request message RB determines whether the request of the bandwidth allocation request message RB is fulfilled by ascertaining the available bandwidths of the two rings 11 and 12. At the step 602, if the request of the bandwidth allocation request message RB is fulfilled, the weighted costs $WC_{i,j,inner}$ and $WC_{i,j,outer}$ are calculated; while if the request of the bandwidth allocation request message RB is not fulfilled, the weighted costs $WC_{i,j,inner}$ and $WC_{i,j,outer}$ are set to infinite values.

Each of the weighted costs $WC_{i,j,inner}$ and $WC_{i,j,outer}$ is calculated by multiplying a cost $Cost_{i,j}$ required to reach a receiving node by weighting function WF(priority, ABW, life_time), which may be calculated using the following equation.

$$WC_{i,j} = Cost_{i,j}(\alpha\ priority + \beta C/ABW + \gamma life\_time) \quad (5)$$

In equation (5), $\alpha$, $\beta$ and $\gamma$ are constants, and parameters that are used to adjust weighted values for a priority, an available bandwidth and a lifetime, respectively.

For example, when $\alpha$ is set to "0", the priority is not taken into consideration. When $\gamma$ is set to "0", the lifetime is not taken into consideration. When $\beta$ is increased, the weight of the available bandwidth is increased; while when $\beta$ is reduced, the weight of the available bandwidth is reduced. If priority is high, the priority has a large value. When the lifetime life_time is not defined or has an excessively large value, the lifetime life_time is restricted to a small value.

Thereafter, if the request of the bandwidth allocation request message RB is not fulfilled on the basis of the available bandwidths of the outer and inner rings 11 and 12 as the result of the determination at step 602, that is, all the weighted costs $WC_{i,j,inner}$ and $WC_{i,j,outer}$ exceed a certain value, for example, both the weighted costs $WC_{i,j,inner}$ and $WC_{i,j,outer}$ are infinite, the available bandwidth does not exist, so the bandwidth allocation request is refused at step 603.

Thereafter, if both the weighted cost $WC_{i,j,inner}$ of the outer ring 11 and the weighted cost of $WC_{i,j,outer}$ of the inner ring 12 are not infinite as the result of the determination at step 602, the two weighted costs are compared to each other at step 604.

Subsequently, a path is allotted to one of the rings having a lower weighted cost at step 605.

After the sequence number is increased at step 606, an allocated result is broadcast to other nodes carried by the bandwidth renewal message BU at step 607.

The bandwidth renewal message BU carries a transmitting node src, a receiving node dst, a sequence number seq, priority and a bandwidth bw.

In that case, if the weighted costs $WC_{i,j,inner}$ and $WC_{i,j,outer}$ of the inner and outer rings 11 and 12 are the same, only the inner ring 12 can be selected. At this time, load is taken into consideration, so the amount of load unevenly distributed to the inner ring 12 is not large.

In that case, an expired bandwidth can be allocated again. Since a path is allotted at the time of allocating the expired bandwidth, a path different from an existing path may be selected.

The weighted costs $WC_{i,j,inner}$ and $WC_{i,j,outer}$ are obtained for the inner and outer rings 11 and 12, respectively.

Figure 7:
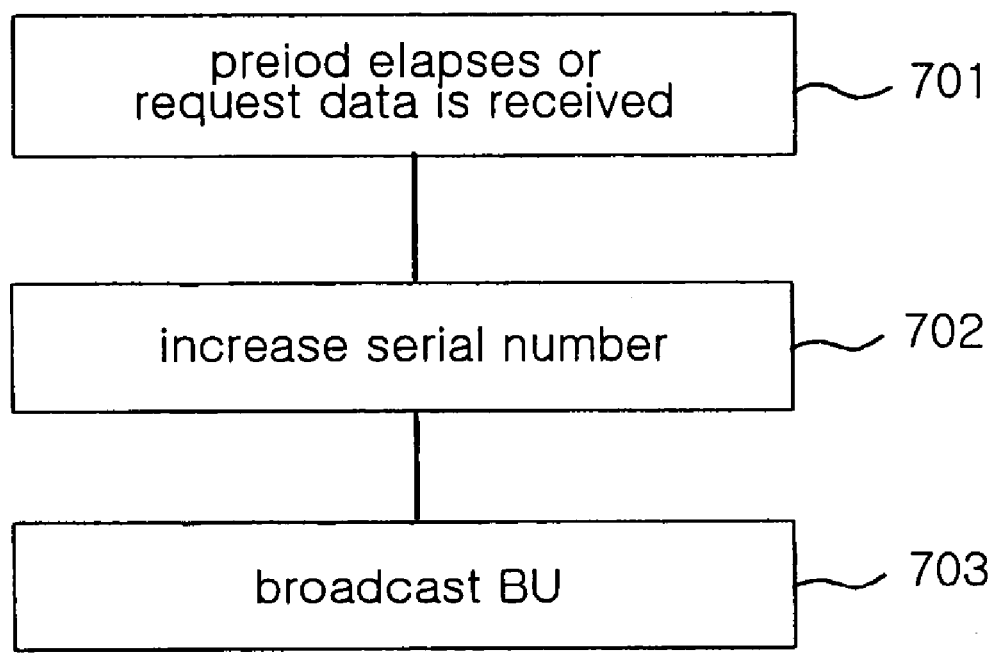
FIG. 7 is a flowchart showing a process of broadcasting a bandwidth renewal message in the resource allocation process of FIG. 6.

FIG. 7 is a flowchart showing a process of broadcasting a bandwidth renewal message periodically or by request in the above-described resource allocation process. If a set period elapses or request data is received from the outside at step 701, a sequence number seq is increased at step 702, and a bandwidth renewal message BU carrying information on a transmitting node src, a receiving node dst, an increased sequence number seq, a priority and a reserved bandwidth bw is broadcast to other nodes at step 703.

Figure 8:
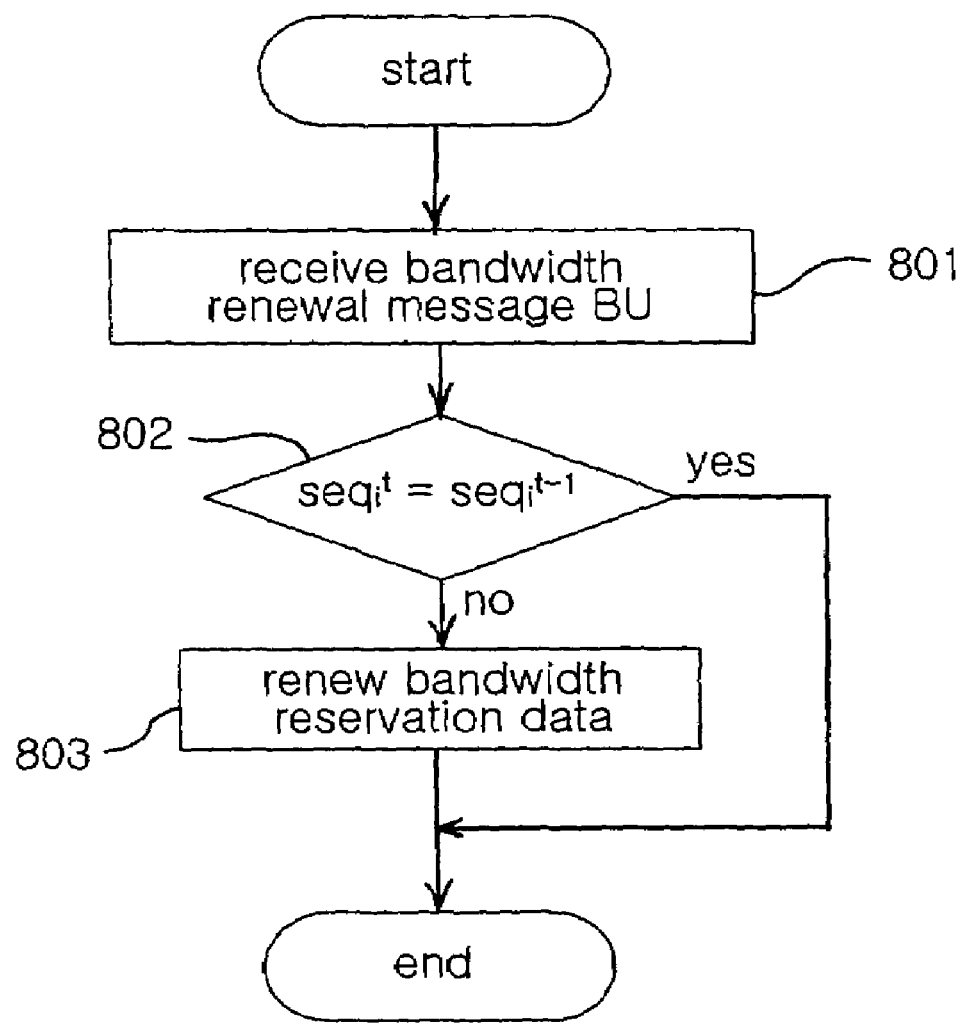
FIG. 8 is a flowchart showing a process of renewing bandwidth reservation data in the resource allocation process of FIG. 6.

FIG. 8 is a flowchart showing a process of receiving the bandwidth renewal message BU transmitted as shown in FIG. 7. When the bandwidth renewal message BU is received from one of other nodes at step 801, each of nodes having received the bandwidth renewal message BU ascertains the sequence number seq of the received bandwidth renewal message BU at step 802. If the received bandwidth renewal message BU is a new message, that is, the sequence number seq of the received bandwidth renewal message BU is different from that of a previously received message, the node replaces the bandwidth reservation data thereof with the data of the bandwidth renewal data; while if the sequence number seq of the received bandwidth renewal message BU is the same as that of a previously received message, the node discards the received bandwidth renewal message BU at step 803.

Figure 9:
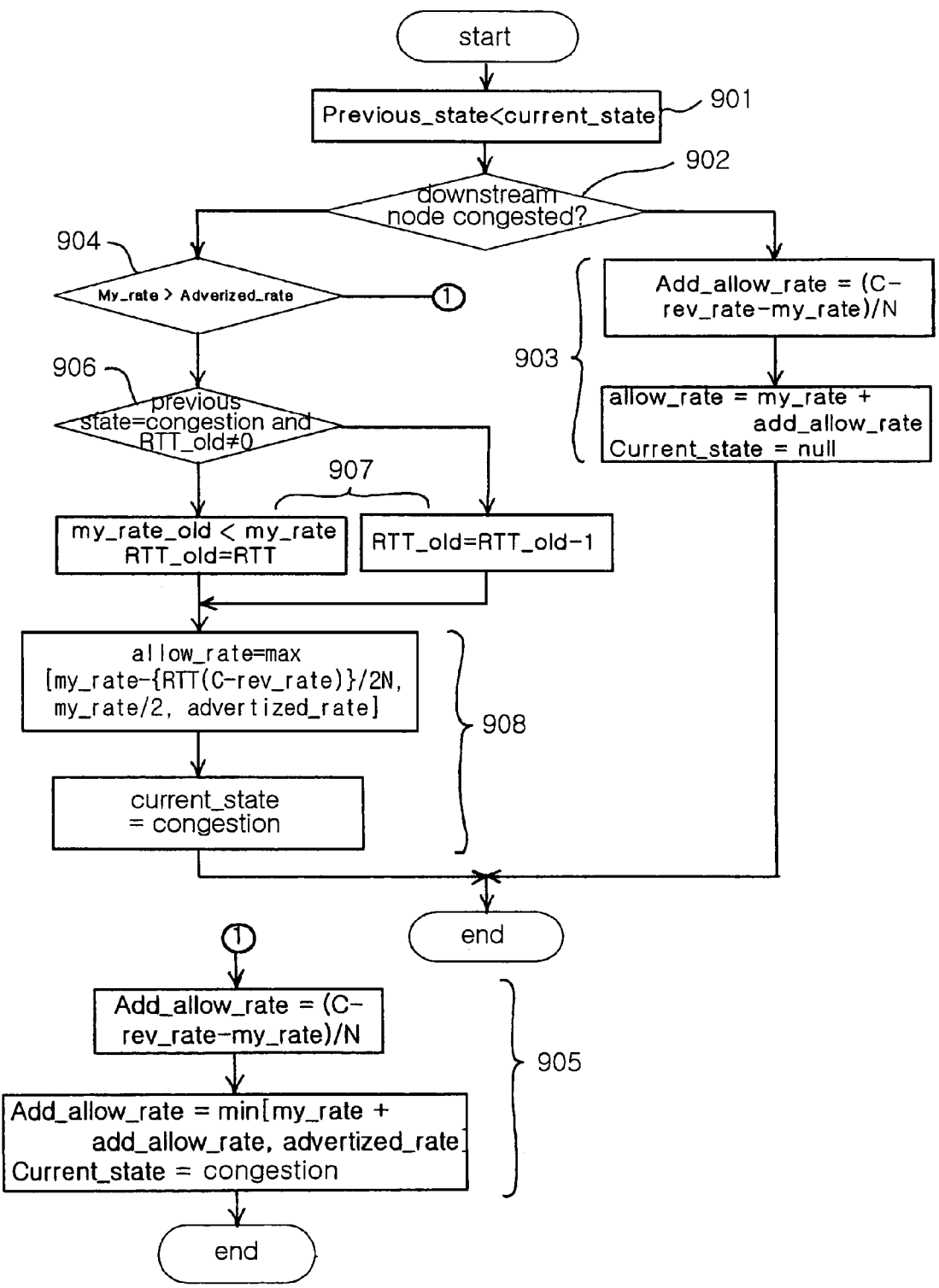
FIG. 9 is a flowchart showing a process of renewing the own rate of a node on a dual ring according to a second embodiment of the present invention.

FIG. 9 is a flowchart showing a process of renewing the own rate of a node according to a second embodiment of the present invention.

In this flowchart, it is assumed that the ring topology can be ascertained by topology discovery, and therefore a description of the topology discovery is omitted herein.

In the above-described case, every node has parameters of its own rate my_rate, a forward rate forward_rate at which the node receives data from an upstream node, an allowable rate allow_rate at which the node can transmit data, an advertised rate advertised_rate of a downstream node, a round trip time to a congested node and the number of the nodes of a ring N. The node controls the rate of a best effort traffic using the parameters, which is described below.

When its rate renewal period elapses, the node sets a current state current_state to a previous state_state, and determines whether a downstream node is congested at step 902.

If the downstream node is not congested as the result of the determination at step 902, the node renews an allowed rate as expressed by the following equation and sets the current state to a null state at step 903. Accordingly, the node having the allowed rate or less can transmit data at the allowed rate or less.

$$Add\_allow\_rate = (C - rev\_rate - my\beta - rate)/N\ allow$$
$$\_rate = my\_rate + Add\_allow\_rate \quad (6)$$

In equation (6), Add_allow_rate is an added allowed rate, C is a link rate, rev-rate is a reserved rate, and my_rate is an own rate. The allowed rate is renewed by adding its own rate and the rate that is obtained by dividing the remaining rate, which is obtained by subtracting the reserved rate rev_rate and the its own rate my-rate from the link rate C, by the number of nodes N.

On the contrary, if the downstream node is congested as the result of the determination at step 902, it is determined whether the rate of the node is higher than the advertised rate at step 904. If the rate of the node is not higher than the advertised rate, the allowed rate is made to be increased as expressed in equation 6. Thereafter, it is determined whether the allowed rate is compared to the advertised rate of the downstream node. After the relatively lower one of the two rates is set to a new allowed rate and the current state of the node is set to a congested state at step 905, the process ends.

$$allow\_rate = \min[my\_rate + (C - rev\_rate - my\_rate)/N, advertised\_rate] \quad (7)$$

Meanwhile, if the own rate of the node is higher than the advertised rate of a congested downstream node, it is determined whether the previous state is a congested state and the previous round trip time RTT_old between neighboring nodes is zero at step 906. If the two above-described conditions are fulfilled, the round trip time between the neighboring nodes is changed to a previous round trip time RTT_old−1 at step 907. Additionally, if at least one of the two conditions are not fulfilled, the current own rate my_rate of the node is set to the previous own rate my_rate_old of the node and the current round trip time RTT is set to the previous round trip time RTT_old at step S907.

The own rate of the node and the round trip time are set according to the congested state as described above, and the allowed rate allow_rate at which the node can transmit data is calculated according to the round trip time RTT as expressed by the following equation at step 908.

$$\text{allow\_rate} = \max[\text{my\_rate} - \{RTT(c\text{-rev\_rate})\}/2N, \text{my\_rate}/2, \text{advertised\_rate}] \quad (8)$$

The excessive reduction of a rate at the downstream node at the time of congestion is prevented by causing the allowed rate to be equal to or higher than the advertised rate. In order to increase the allowed rate of the downstream node, the own rate of the node is reduced by a multiple of RTT/2. In this case, the basic unit of the RTT is the period of a pair packet.

Each node of a network periodically transmits a pair packet to an upper packet, which has information on a congestion state, an upstream round trip time timestamp up_RTT_time_stamp and a downstream round trip time timestamp down_RTT_time_stamp. Since there are two rings, neighboring nodes perform duplex communication. It is determined whether a random node is congested. If the random node is congested, the own rate of the random node is set to the advertised rate at the upstream node. If the random node is congested, "null" information is carried by the pair packet to the upstream node. A node generating a congestion packet causes an upstream round trip time timestamp up_RTT_time_stamp to carry its own timestamp time_stamp, sets the upstream round trip time timestamp up_RTT_time_stamp of a pair packet received from an opposite ring to a downstream round trip time timestamp down_RTT_time_stamp, and transmits it to the upstream node. Processes of setting timestamps at nodes generating and receiving a congestion packet are shown in FIGS. 10a and 10b.

Figure 10A:
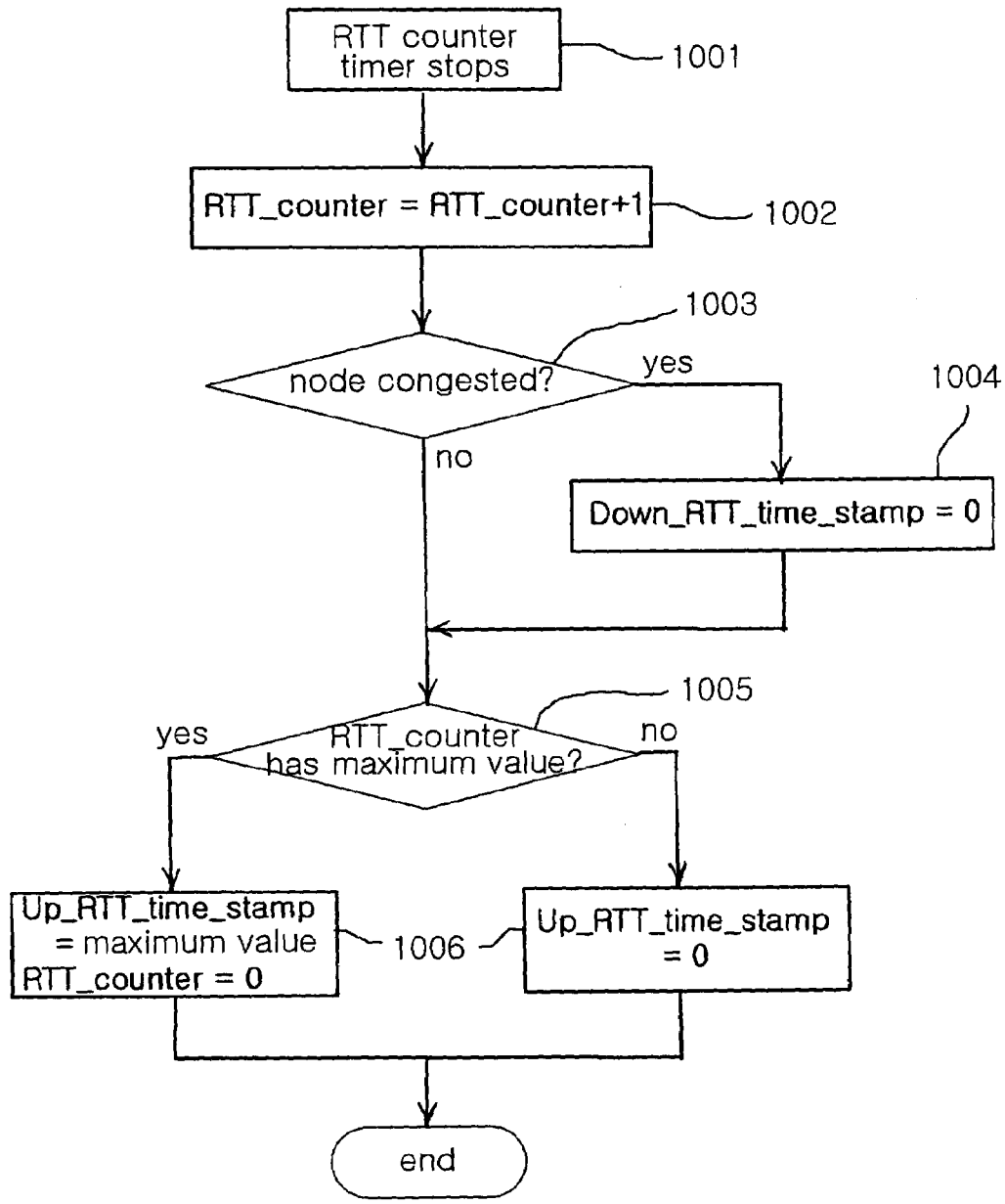
FIGS. 10a and 10b are flowcharts showing a process of measuring a round trip time in the resource allocation method of the present invention.
Figure 10B:
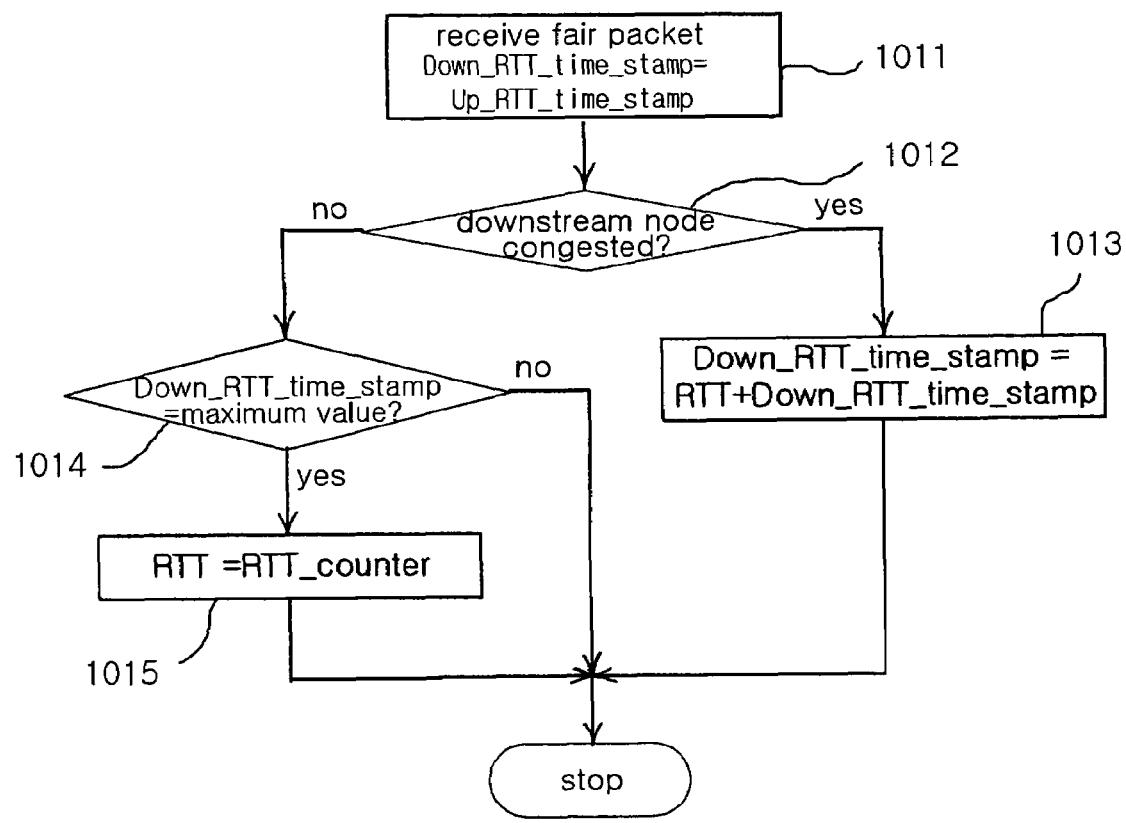

FIG. 10a is a flowchart showing a process of setting an upstream round trip time timestamp, and FIG. 10b is a flowchart showing a process of setting a downstream round trip time timestamp.

As shown in FIG. 10a, in the process of setting the upstream round trip time timestamp, when a round trip time counter timer measuring the period of a round trip time counter stops at step 1001, the round trip time counter RTT_counter is increased by "1" at step 1002, and it is determined whether the node is congested at step 1003. In this case, only when the node is congested, the downstream round trip time timestamp down_RTT_timestamp is set to "0" at step 1004.

Thereafter, it is determined whether the increased round trip time counter RTT-counter has a maximum value at step 1005. If the round trip time counter RTT_counter has the maximum value, the upstream round trip time counter up_RTT_time_stamp is set to the maximum value and the round trip time counter RTT_counter is reset to "0". On the contrary, if the round trip time counter RTT_counter does not have the maximum value, the upstream round trip time timestamp up_RTT_time_stamp is set to "0" at step 1006, and thereafter the process ends.

Meanwhile, if an upstream node is not congested, the upstream round trip time timestamp up_RTT_time_stamp is returned as the downstream round trip time timestamp. Accordingly, the round trip time counter RTT-counter of a base node at the time when the upstream round trip time timestamp is returned from the upstream node to the base node is a round trip time between the two nodes.

As shown in FIG. 10b, the process of setting the downstream round trip time timestamp down_RTT_time_stamp is performed whenever a pair packet is received at step 1011. In this case, the downstream round trip time timestamp down_RTT_time_stamp is set to the upstream round trip time timestamp up_RTT_time_stamp. The set downstream round trip time timestamp down_RTT_time_stamp is transmitted to the opposite ring, used to calculate a round trip time at a node having first received a pair packet, and eliminated. When the pair packet is received, the node determines whether the downstream node is congested at step 1012.

Thereafter, if the downstream node is congested, the downstream round trip time timestamp is increased by the round trip time RTT of a node at step 1013. If the downstream node is not congested, it is determined whether the downstream round trip time timestamp down_RTT_time_stamp has a maximum value at step 1014. If the downstream round trip time timestamp down_RTT_time_stamp does not have the maximum value, the process ends; while if the downstream round trip time timestamp down_RTT time_stamp has the maximum value, the round trip time RTT is set to the current round trip time counter RTT_counter at step 1015.

The round trip time counter RTT_counter set through the above-described process may be utilized as the round trip time value. If a round trip time RTT is not measured, the round trip time RTT may be set to an integer value equal to or larger than double the number of nodes between a node and a congested node. In this case, the number of nodes N is a known parameter because the ring topology is ordinarily managed. The measurement of the round trip time may be carried out as described above.

Figure 11A:
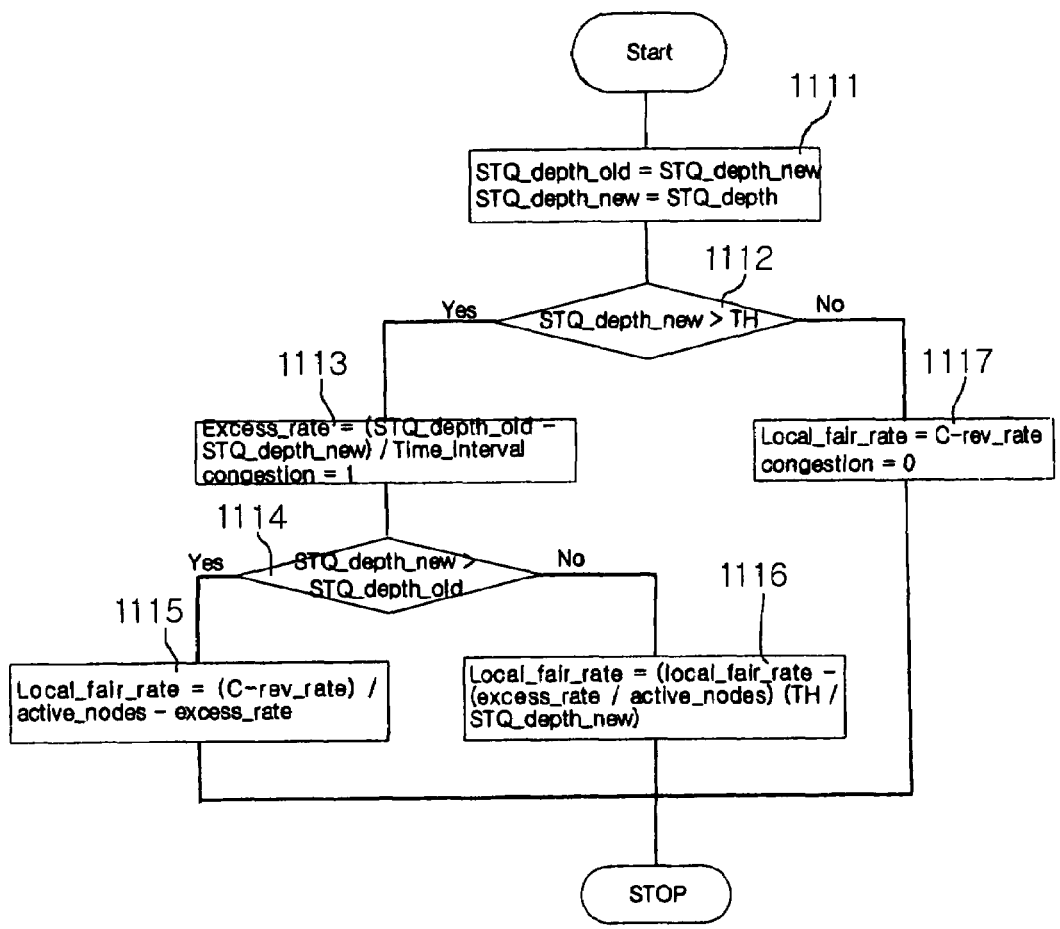
FIG. 11a is a flowchart showing a process of updating a local fair rate for resource allocation in a dual ring according to a third embodiment of the present invention.
Figure 11B:
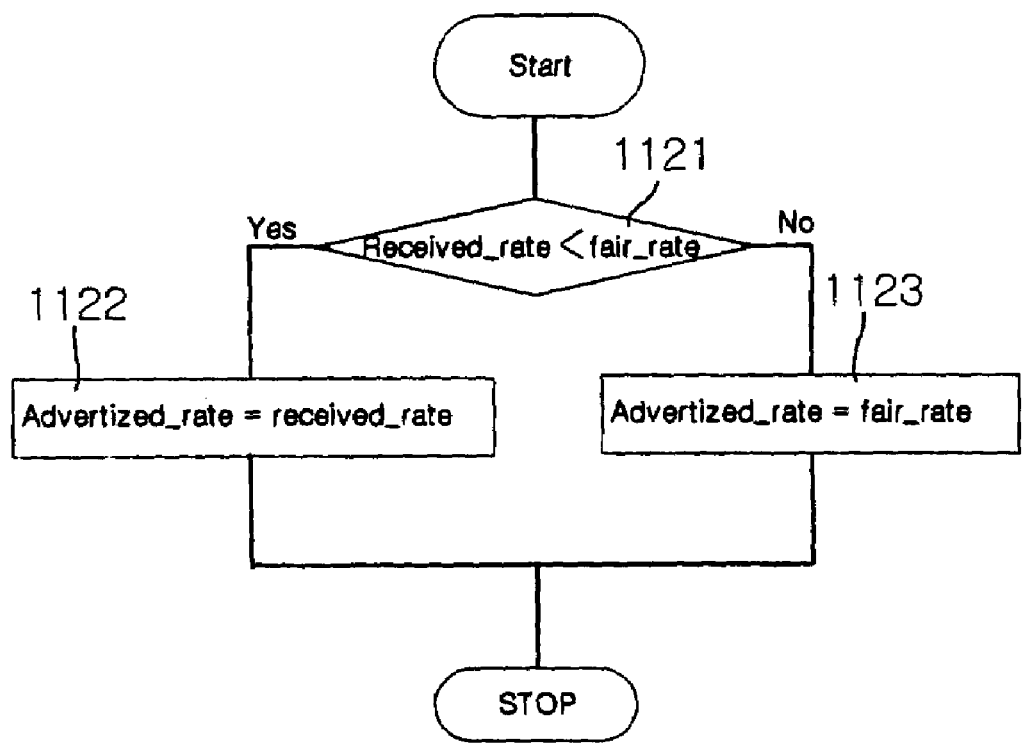
FIG. 11b is a flowchart showing a process of updating an advertised rate in the dual ring of the third embodiment.
Figure 12:
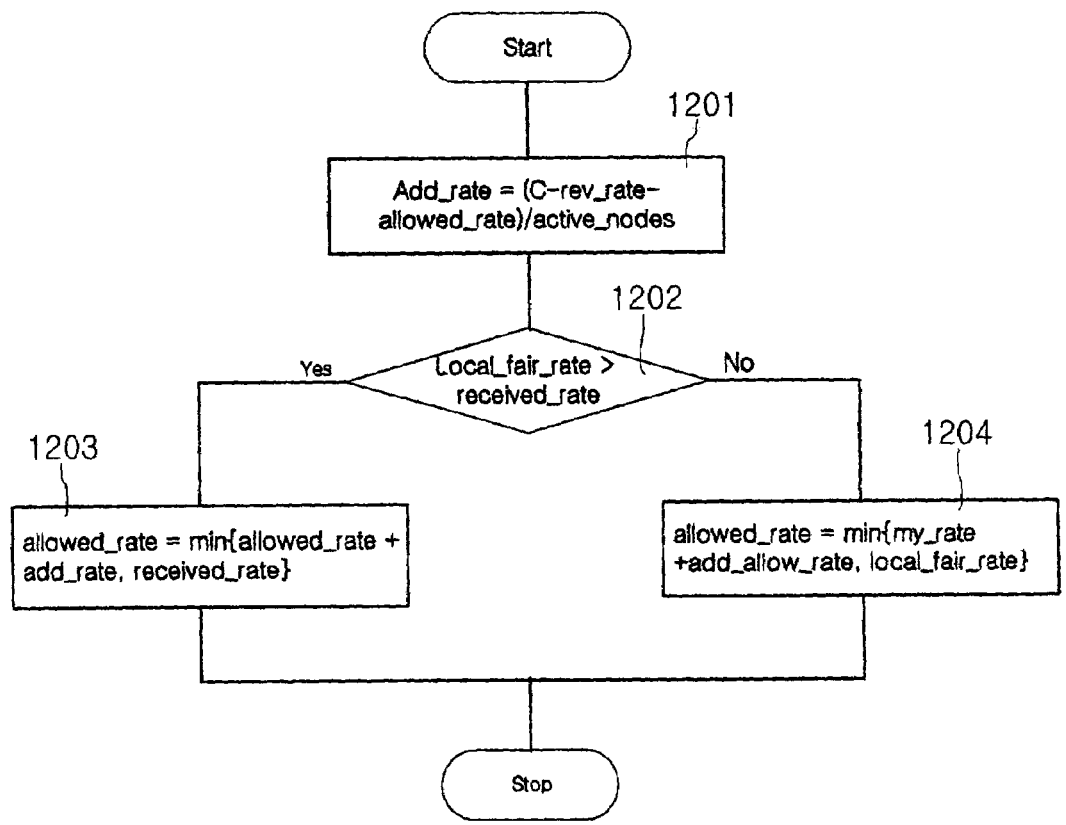
FIG. 12 is a flowchart showing a process of updating an allowed rate at regular intervals in a resource allocation method in the dual ring of the third embodiment.

FIGS. 11a to 12 are flowcharts showing a resource allocation process in a dual ring in accordance with a third embodiment of the present invention. In the third embodiment of the present invention, the transit buffer 21 of each node is provided with a Primary Transit Queue (PTQ) and a Secondary Transit Queue (STQ).

FIG. 11a is a flowchart showing a process of updating a local fair rate. In the third embodiment of the present invention, the fair rate is updated at each node of the dual ring at regular intervals. When an updating interval of the fair rate arrives, the packet size of the STQ STQ_depth is read, the value of the current packet size of the STQ STQ_depth_new is changed to the value of the previous packet size of the STQ STQ_depth_old, and the read packet size of the STQ STQ_depth is updated to STQ_depth_new at step 1111. Thereafter, the packet size of the STQ STQ_depth is compared with a critical value TH at step S1112. If the packet size of the STQ STQ_depth is equal to or smaller than the critical value TH, the local fair rate is set to a non-reserved rate C-rev_rate at step 1117. In contrast, if the packet size of the STQ STQ_depth is larger than the critical value TH, data to be transmitted to a next node is backlogged. In this case, an excess rate excess_rate for output link capacity is set to a value obtained by dividing the difference between the current packet size STQ_depth_new and the previous packet size STQ_depth_old by the interval at which the packet size is measured, and a current state is set to a congested state at step 1113. Thereafter, the current packet size STQ_depth_new is compared with the previous packet size STQ_depth_old at step 1114. If the current packet size STQ_depth_new is larger than the previous packet size STQ_depth_old, the size of packets backlogged in the STQ is increased. Otherwise, the size of packets backlogged in the STQ is reduced. The case where the size of packets backlogged in the STQ is increased corresponds to the case where traffic higher than an output link rate is input. In contrast, the case where the size of packets backlogged in the STQ is reduced corresponds to the case where traffic lower than an input link rate is input. Accordingly, if the current packet size STQ_depth_new is larger than the previous packet size STQ_depth_old, the local fair rate of a corresponding node is set to the value obtained by subtracting the excessive rate excess_rate from the value obtained by dividing the non-reserved rate C-rev_rate by the number of active nodes by the following equation at step 1115.

$$\text{Local\_fair\_rate} = C\text{-rev\_rate}/\text{active\_nodes} - \text{excess\_rate} \quad (9)$$

In contrast, if the current packet size STQ_depth_new is equal to or smaller than the previous packet size STQ_depth_old, the local fair rate is set to the value by the following equation at step 1116.

$$\text{Local\_fair\_rate} = (\text{Local\_fair\_rate} - (\text{excess\_rate}/\text{active\_nodes}) \times (TH/STQ\_\text{depth\_new})) \quad (10)$$

In this case, the excessive rate has a negative value, so that the local fair rate is increased. The increase of the local fair rate is controlled according to the size of packets backlogged in the STQ. That is, if the size of packets backlogged in the STQ is large, the increased local fair rate becomes low. If the size of packets backlogged in the STQ is small, the increased local fair rate becomes similar to the excessive rate. However, in any case, the increased local fair rate does not become higher than the excessive rate.

Thereafter, as shown in FIG. 11b, the received rate of a packet received_rate is compared with the local fair rate of the corresponding node at step S1121. And as the following equation, if the received rate received-rate is lower than the local fair rate, an advertised rate is set to the received rate received_rate at step 1122. In contrast, if the received rate received-rate is equal to or higher than the local fair rate, the advertised rate is set to the local fair rate set as described above at step 1123. The value is transferred to an upstream node at regular intervals. If the upstream node receives the value, the value becomes an upstream received rate.

$$\text{Advertized\_rate} = \text{received\_rate}, (\text{received\_rate} > \text{fair\_rate}) \quad (11)$$
$$= \text{fair\_rate}, (\text{received\_rate} \not> \text{fair\_rate})$$

Each node, which transfers data, updates an allowed rate thereof at regular intervals, which is performed as shown in FIG. 12. The allowed rate is set to a small value at an initial stage and, thereafter, is updated as described below. First, an added rate is set to the value obtained by dividing the difference between the non-reserved rate and the allowed rate allowed_rate by the number of active nodes at step 1201. Thereafter, the local fair rate is compared with the received rate of a data packet received_rate at step 1202. If the local fair rate is higher than the received rate of a data packet received_rate, the allowed rate is set to a lower one of the received rate and the value obtained by adding the increasing rate to the allowed rate as the following equation at step 1203.

$$\text{allowed\_rate} = \min\{\text{allowed\_rate} + \text{add\_rate}, \text{received\_rate}\} \quad (12)$$

In contrast, if the local fair rate is equal to or lower than the received rate of a data packet received_rate, the allowed rate is set to a lower one of the value obtained by adding an added allowed rate add_allow-rate to a self rate my_rate as the following equation at step 1204.

$$\text{allowed\_rate} = \min\{\text{allowed\_rate} + \text{add\_allow\_rate}, \text{local\_fair\_rate}\} \quad (13)$$

The allowed rate set as described above is the maximal value of traffic that can be transmitted from a node to the dual ring. That is, a corresponding node can transmit traffic at the rate equal to or lower than the allowed rate.

As described above, the present invention provides a resource allocation method for providing load balancing and fairness for a dual ring in accordance with the present invention, which is capable of improving the efficiency of utilization of resources by selecting a route in consideration of network topology, a current available bandwidth and the priority of required traffic, and which is capable of improving the efficiency of utilization of resources and providing fairness to nodes by transmitting data from a transmitting node at an increased rate in the case of a best effort service and reducing a bandwidth required by network topology and a congested node in the case of congestion.

In addition, a resource allocation method for providing load balancing and fairness for a dual ring in accordance with the present invention improves the performance of a dual ring and therefore can be applied to the traffic control of the dual ring including a Resilient Packet Ring (RPR).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A resource allocation method for providing load balancing and fairness for a dual ring, the dual ring being shared by a plurality of nodes connected to local networks, comprising the steps of:
   determining whether a bandwidth allocation request message is received from one of other nodes;
   determining whether one or more of two rings of the dual ring fulfill a request of the bandwidth allocation request message on the basis of available bandwidths of the two rings and calculating weighted costs, if the bandwidth allocation request message is received;
   allocating a path to one of the two rings having a lower weighted cost, if one or more of two rings fulfill the request of the bandwidth allocation request message;
   providing a resource allocation information notification message to other nodes; and
   ending a process without allocation of a path, if one or more of two rings cannot fulfill the request of the bandwidth allocation request message;
   wherein the bandwidth allocation request message includes information on a transmitting node, a receiving node, a bandwidth, a priority and a lifetime.

2. The resource allocation method as set forth in claim 1, wherein the resource allocation information notification message carries information on a transmitting node, a receiving node, a sequence number, and bandwidths reserved from the transmitting node to other nodes.

3. The resource allocation method as set forth in claim 1 or claim 2, wherein at the step of calculating weighted costs, the weighted costs are calculated using the following equation $$WC_{ij} = \text{Cost}_{ij}(\alpha \text{priority} + \beta C/ABW + \gamma \text{life\_time})$$

where $WC_{ij}$ is a weighted cost required to reach a receiving node Nj from a transmitting node Ni, $\text{Cost}_{ij}$ is a cost required to reach a receiving node Nj from a transmitting node Ni, priority is the right to take precedence, life_time is lasting time, and α,β and γ are constants, and parameters that are used to adjust weighted values for a priority, an available bandwidth and a lifetime, respectively.

4. The resource allocation method as set forth in claim 1 or claim 2, wherein the step of calculating weighted costs is performed in such a way that if the two rings cannot fulfill the request of the bandwidth allocation request message, the weighted costs are set to an infinite value, or values excessively larger than weighted costs for the case where the request of the bandwidth allocation request message can be fulfilled.

5. The resource allocation method as set forth in claim 1 or claim 2, wherein the step of providing the resource allocation information notification message comprises the steps of:
determining whether a bandwidth renewal message transmission period elapses or a request data is received;
increasing a sequence number if the bandwidth renewal message transmission period elapses or the request data is received; and
broadcasting a bandwidth renewal message carrying an increased sequence number, reserved bandwidth information and a priority.

6. The resource allocation method as set forth in claim 1 or claim 2, further comprising the steps of determining whether a sequence number of a currently received bandwidth renewal message equals a sequence number of a previously received bandwidth renewal message at the time of receiving the bandwidth renewal message, and renewing bandwidth reservation information only when the sequence number of the currently received bandwidth renewal message equals the sequence number of the previously received bandwidth renewal message.

7. A resource allocation method for providing load balancing and fairness for a dual ring, the dual ring being shared by a plurality of nodes connected to local networks, comprising the steps of:
setting a current state to a previous state;
determining whether a downstream node is congested;
setting an allowed rate using equation allow_rate=my$_{13}$rate=(C-rev_rate-my _rate)/N (where allow_rate is an allowed rate of a base node, C is a rate of a link, rev_rate is a reserved rate, my_rate is an own rate of the base node, and N is a number of nodes) and setting the current state to a null state, if the downstream node is not congested; determining whether an own rate of the base node is greater than an advertised rate of the downstream node, if the downstream node is congested;
setting the allowed rate using equation allow$_{13}$ rate=min [my_rate=(C-rev_rate-my_rate)/N,advertised_rate] (where advertised_rate is an advertised rate) and setting the current state to a congested state, if the own rate of the base node is not greater than the advertised rate of the downstream node;
determining whether the previous state is a congested state and whether a previous round trip time is not zero, if the own rate of the base node is greater than the advertised rate of the downstream node;
setting the previous round trip time to the previous round trip time minus one, if the previous state is the congested state and the previous round trip time is not zero, and setting a current round trip time to the previous round trip time, if the previous state is not the congested state and the previous round trip time is zero;
setting the allowed rate using equation allow_rate =max [my_rate-{RTT(c-rev_rate)}/2N, my_rate/2, advertised_rate]and setting the current state to a congested state; and
providing a resource allocation information notification message to other nodes.

8. The resource allocation method as set forth in claim 7, further comprising the steps of:
initializing parameters of a round trip time counter, an upstream round trip time timestamp and a downstream round trip time timestamp;
measuring a round trip time counting period, and increasing a round trip time counter by "1"when the round trip time counting period elapses;
setting the downstream round trip time timestamp to "0"if a node is congested;
determining whether the increased round trip time counter has a maximum value; and
setting the upstream round trip time counter to the maximum value and resetting the round trip time counter to "0"if the round trip time counter has the maximum value, and setting the upstream round trip time timestamp to "0"if the round trip time counter does not have the maximum value.

9. The resource allocation method as set forth in claim 7 or 8,further comprising the steps of:
determining whether the downstream node is congested when the fair packet is received;
increasing the downstream round trip time timestamp by a round trip time of a base node if the downstream node is congested;
determining whether the downstream round trip time timestamp has a maximum value if the downstream node is not congested, ending a process if the downstream node is not congested and the downstream round trip time timestamp does not have the maximum value, and setting the round trip time to a value of the current round trip time counter if the downstream node is not congested and the downstream round trip time timestamp has the maximum value.

10. A resource allocation method for providing load balancing and fairness for a dual ring, the dual ring being shared by a plurality of nodes connected to local networks, each of the nodes being provided with a Primary Transit Queue (PTQ) and a Secondary Transit Queue (STQ), comprising the steps of:
reading a packet size of the STQ at regular intervals, and updating a local fair rate so that the local fair rate is reduced if a size of backlogged packets increases and the local fair rate approaches an initial rate if the size of backlogged packets decreases;
comparing the set local fair rate with a received rate of a packet, and setting an advertised rate;
determining whether congestion has occurred, setting an allowed rate to the local fair rate if the congestion has occurred, and increasing the allowed rate by {(a non-reserved rate-a previous allowed rate)/a certain coefficient};
wherein the steps are performed at each of the nodes to control traffic of the node; and
providing a resource allocation information notification message to other nodes.

11. The resource allocation method as set forth in claim 10, wherein the step of updating the local fair rate comprises the steps of:
reading the packet size of the STQ at regular intervals, changing a value of a current packet size to a value of a previous packet size, and setting the current packet size to the read packet size of the STQ;

comparing the read packet size of the STQ with a critical value;

if, as a result of the comparison, the read packet size of the STQ is equal to or smaller than the critical value, setting the local fair rate to the non-reserved rate;

if, as a result of the comparison, the read packet size of the STQ is larger than the critical value, setting an excessive rate of output link capacity to (a difference between the current packet size and the previous packet size/an interval at which the packet size is measured), and setting a current state to a congestion state;

comparing the current packet size with the previous packet size;

if, as a result of the comparison, the current packet size is larger than the previous packet size, setting the local fair rate to (the non-reserved rate/a number of nodes-the excessive rate); and if, as a result of the comparison, the current packet size is equal to or small than the previous packet size, setting the local fair rate to {a current local fair rate-(the excessive rate/a number of active nodes.times.the critical value/the current packet size)}.

12. The resource allocation method as set forth in claim 10, wherein the step of setting the advertised rate comprises the steps of:

comparing the received rate of the packet with a set local fair rate;

if, as a result of the comparison, the received rate is higher than the set local fair rate, setting the advertised rate to the received rate; and if, as a result of the comparison, the received rate is equal to or lower than the set local fair rate, setting the advertised rate to the set node fair rate;

wherein the advertised rate is transferred to an upstream node at regular intervals and becomes a received rate at the upstream node.

13. The resource allocation method as set forth in claim 10, wherein, at the step of setting the allowed rate according to the congestion, the coefficient is set to prevent a rapid change of the allowed rate.

14. The resource allocation method as set forth in claim 10, further comprising the step of updating the allowed rate so as to transfer traffic equal to or lower than the allowed rate at an a corresponding node, the step of updating the allowed rate comprising the steps of:

initializing the allowed rate to a small value;

setting an add rate to a value obtained by dividing a difference between the non-reserved rate and the allowed rate by a number of active nodes;

comparing the local fair rate with the received rate of the packet;

if, as a result of the comparison, the local fair rate is higher than the received rate, setting the allowed rate to a lower one of the received rate and a value obtained by adding the added rate to the allowed rate; and if, as a result of the comparison, the local fair rate is equal to or lower than the received rate, setting the allowed rate to a lower one of a value obtained by adding an added allowed rate to a self-rate and the local fair rate.

15. A computer-readable storage medium, comprising: a medium body; and a program stored in the medium body, the program for executing steps of a method described in claims 1,7 or 10.

* * * * *